(12) United States Patent
Smalley et al.

(10) Patent No.: US 6,899,945 B2
(45) Date of Patent: May 31, 2005

(54) ENTANGLED SINGLE-WALL CARBON NANOTUBE SOLID MATERIAL AND METHODS FOR MAKING SAME

(75) Inventors: Richard E. Smalley, Houston, TX (US); Ramesh Sivarajan, Houston, TX (US)

(73) Assignee: William Marsh Rice University, Houston, TX (US)

( * ) Notice: Subject to any disclaimer, the term of this patent is extended or adjusted under 35 U.S.C. 154(b) by 4 days.

(21) Appl. No.: 10/391,988

(22) Filed: Mar. 19, 2003

(65) Prior Publication Data

US 2003/0211028 A1 Nov. 13, 2003

Related U.S. Application Data

(60) Provisional application No. 60/365,639, filed on Mar. 19, 2002.

(51) Int. Cl.[7] .................................................. B32B 3/20
(52) U.S. Cl. ................................. 428/314.8; 428/314.2; 428/315.9; 428/319.3; 428/319.1; 428/220; 423/445 B; 423/445 R; 2/2.5
(58) Field of Search ........................... 428/314.2, 315.9, 428/314.8, 319.3, 319.1, 220; 423/445 B, 445 R; 2/2.5

(56) References Cited

FOREIGN PATENT DOCUMENTS

| WO | WO 98/39250 | * | 9/1998 |
| WO | WO 00/17101 | * | 3/2000 |
| WO | WO 01/30694 | * | 5/2001 |
| WO | WO 02/39051 | * | 5/2002 |
| WO | WO 02/64868 | * | 8/2002 |
| WO | WO 02/64869 | * | 8/2002 |

OTHER PUBLICATIONS

Yakobson et al., "Fullerene Nanotubes: C1,000,000 and Beyond," American Scientist, vol. 85, pp. 324–337 (1997).
Dresselhaus et al., Science of Fullerenes and Carbon Nanotubes, San Diego: Academic Press, Ch. 19 (1996).
Chiang et al., "Purification and Characterization of Single-Wall Carbon Nanotubes (SWNTs) Obtained from the Gas-Phase Decomposition of CO (HiPco Process)," Journal of Physical Chemistry B, vol. 105, pp. 8297–8301 (2001).
Chiang et al., "Purification and Characterization of Single-Walled Carbon Nanotubes," Journal of Physical Chemistry B, vol. 105, pp. 1157–1161 (2001).
Popov, et al., "Superhard phase composed of single–wall carbon nanotubes", Physical Review B, vol. 65 (2002), pp. 33408–1–33408–4.

* cited by examiner

Primary Examiner—David J. Buttner
Assistant Examiner—Christopher Keehan
(74) Attorney, Agent, or Firm—Ross Spencer Garsson Winstead Sechrest & Minick P.C.

(57) ABSTRACT

Buckyrock is a three-dimensional, solid block material comprising an entangled network of single-wall carbon nanotubes (SWNT), wherein the block comprises greater than 75 wt % SWNT. SWNT buckyrock is mechanically strong, tough and impact resistant. The single-wall carbon nanotubes in buckyrock form are present in a random network of individual single-wall carbon nanotubes, SWNT "ropes" and combinations thereof. The random network of the SWNT or SWNT ropes can be held in place by non-covalent "cross-links" between the nanotubes at nanotube contact points. In one embodiment, SWNT buckyrock is made by forming a SWNT-water slurry, slowly removing water from the slurry which results in a SWNT-water paste, and allowing the paste to dry very slowly, such that the SWNT network of the SWNT-water paste is preserved during solvent evaporation. Buckyrock can be used in applications, such as ballistic protection systems, involving light-weight material with mechanical strength, toughness and impact resistance.

24 Claims, 5 Drawing Sheets

ENTANGLED SINGLE-WALL CARBON NANOTUBE SOLID MATERIAL AND METHODS FOR MAKING SAME

CROSS-REFERENCE TO RELATED APPLICATION

This application claims priority from U.S. provisional application Ser. No. 60/365,639, filed Mar. 19, 2002, which application is incorporated herein by reference.

This invention was made with United States Government support under Grant No. NSF-FRG DMR-0073046 awarded by the National Science Foundation, Grant No. NCC 9-77 awarded by the National Aeronautic and Space Administration, Grant No. N00014-01-1-0789 awarded by the Office of Naval Research, and DURINT Grant No. N00014-01-1-0791. Funding was also provided by the Texas Advanced Technology Program Grant No. TATP 99-003604-0055-199, and the Robert A. Welch Foundation Grant No. C-0689. Government may have certain rights in the invention.

FIELD OF THE INVENTION

This invention relates generally to single-wall carbon nanotubes, and more particularly to a macroscopic solid block material comprising single-wall carbon nanotubes wherein the solid block material comprises greater than 75 wt % single-wall carbon nanotubes and wherein the solid block material has mechanical strength, impact resistance and toughness.

BACKGROUND OF THE INVENTION

Single-wall carbon nanotubes (SWNT), commonly known as "buckytubes," have unique properties, including high strength, stiffness, thermal and electrical conductivity. SWNT are hollow, tubular fullerene molecules consisting essentially of $sp^2$-hybridized carbon atoms typically arranged in hexagons and pentagons. Single-wall carbon nanotubes are typically between 0.5 and 3 nanometers in diameter and usually more than 100 nanometers in length. Multi-wall carbon nanotubes are nested single-wall carbon cylinders and possess some properties similar to single-wall carbon nanotubes. However, since single-wall carbon nanotubes have fewer defects than multi-wall carbon nanotubes, single-wall carbon nanotubes are generally stronger and more conductive. Background information on single-wall carbon nanotubes can be found in B. I. Yakobson and R. E. Smalley, *American Scientist*, Vol. 85, July–August, 1997, pp. 324–337 and Dresselhaus et al., *Science of Fullerenes and Carbon Nanotubes*, 1996, San Diego: Academic Press, Ch. 19.

Macroscopic forms of single-wall carbon nanotubes have generally been limited to films and composites with other materials, such as polymers. A macroscopic solid block material comprising primarily single-wall carbon nanotubes is heretofore unknown.

SUMMARY OF THE INVENTION

This invention relates to a macroscopic solid block material comprising a three-dimensional, entangled network of single-wall carbon nanotubes, wherein the block solid material comprises greater than about 75 wt % single-wall carbon nanotubes and wherein the solid block material has properties of mechanical impact resistance, toughness and strength, and method for making the same. The single-wall carbon nanotubes in the solid block form of matter, also called "buckytube rock" or "buckyrock" herein, are present either as individual single-wall carbon nanotubes or as "ropes" of single-wall carbon nanotubes, which are multiple single-wall carbon nanotubes, bundled as groups and generally aligned along their long axis. Note that the term "block" or "block solid" shall mean any form or shape of a 3-dimensional material, generally at least about 1 mm in each dimension, and not limited to a straight-sided cubic or rectangular shape. This definition includes both regular and irregular shaped objects.

In one embodiment of the invention, the single-wall carbon nanotube solid block material is prepared by purifying the nanotubes to remove extraneous carbonaceous material and metallic catalytic residue. The purification includes oxidative burning of the carbonaceous material and mixing with aqueous acid to react with the residual catalytic metal. Mixing of the aqueous acid and SWNT results in a SWNT-acid slurry. The excess acid is filtered from the slurry and, while still in the filter, the slurry is washed with water until the filtrate is clear and the pH is neutral. Excess water is drained from the resulting SWNT-water slurry. As the water is drained, a gel-like, SWNT-water paste is formed from the SWNT-water slurry. The moisture from the SWNT-water paste is slowly evaporated in order to retain the entangled nanotube structure during drying. The resulting solid block material comprising entangled single-wall carbon nanotubes has properties of mechanical toughness, impact resistance and strength. This solid block comprising single-wall carbon nanotubes is called a buckytube rock or a buckyrock. The buckyrock typically comprises more than 75 wt % SWNT, preferably greater than about 85 wt % SWNT, more preferably greater than about 90 wt % SWNT, and even more preferably greater than 95 wt % SWNT.

DETAILED DESCRIPTION OF SPECIFIC EMBODIMENTS OF THE INVENTION

Figure 1:
FIG. 1 is a photograph of a highly polished piece of buckyrock.

A buckyrock is a three-dimensional solid block material comprising, isotropically entangled single-wall carbon nanotubes wherein the solid block material comprises at least about 75 wt % single-wall carbon nanotubes. Preferably, the block material comprises at least about 85 wt % SWNT, more preferably greater than about 90 wt % SWNT, and even more preferably greater than 95 wt % SWNT. The solid block material comprising single-wall carbon nanotubes has properties of mechanical strength, impact resistance and toughness.

The single-wall carbon nanotubes in buckyrock form are present in a random network of individual single-wall carbon nanotubes, SWNT "ropes" and combinations thereof. The random network of SWNT and/or SWNT ropes is structured by non-covalent "crosslinks" between the nanotubes which hold the nanotubes together at points of contact. Although not meant to be held by theory, non-covalent "crosslinking" could be attributed to attractive forces, such as van der Waals forces, hydrogen bonding or combinations thereof. In another embodiment, the single-wall carbon nanotubes could be end or side-wall derivatized, and covalent or ionic crosslinks could hold the nanotubes together in a rigid or semi-rigid form.

In one embodiment, the new, three-dimensional buckyrock, comprising an entangled network of single-walled carbon nanotubes, is made by slow evaporation of water from a gel-like, SWNT-water paste. The slow water evaporation causes the SWNT-water paste to isotropically shrink into a solid block material of buckyrock.

Single-wall carbon nanotubes can be made from any known means, such as by gas-phase synthesis from high temperature, high pressure carbon monoxide, catalytic vapor deposition using carbon-containing feedstocks and metal catalyst particles, laser ablation, arc method, or any other method for synthesizing single-wall carbon nanotubes. The single-wall carbon nanotubes obtained from synthesis are generally in the form of single-wall carbon nanotube powder.

In one embodiment, single-wall carbon nanotube powder is purified to remove non-nanotube carbon, such as amorphous carbon and metallic catalyst residues. Metals, such as Group VI and/or VIII are possible catalysts for the synthesis of single-wall carbon nanotubes, and the metallic residues after catalysis may be encapsulated in non-nanotube carbon, such as graphitic shells of carbon. The metallic impurities may also be oxidized through contact with air or by oxidation of the non-nanotube carbon during purification.

Purification can be done by any known means. Procedures for purification of carbon nanotubes are related in International Patent Publications "Process for Purifying Single-Wall Carbon Nanotubes and Compositions Thereof," WO 02/064,869 filed Feb. 11, 2002 and "Gas Phase Process for Purifying Single-Wall Carbon Nanotubes and Compositions Thereof", WO 02/064,868 filed Feb. 11, 2002, and included herein in their entirety by reference. In one embodiment, the nanotubes are purified by heating at 250° C. in air saturated with water vapor. The heating is done for a length of time so as to oxidize at least some of the non-nanotube carbon, and, may, to some extent, oxidize the metal impurities. The oxidation temperature can be in the range of about 200° C. to about 400° C., preferably about 200° C. to about 300° C. The oxidation can be conducted in any gaseous oxidative environment, which can comprise such oxidative gases as such as oxygen, air, carbon dioxide, and combinations thereof. The concentration of the oxidative gases can be adjusted and controlled by blending with nitrogen, an inert gas, such as argon, or combinations thereof. The duration of the oxidation process can range from a few minutes to days, depending on the oxidant, its concentration, and the oxidation temperature.

After oxidatively heating the nanotubes, the nanotubes are treated with acid to remove metallic impurities and to form a slurry of nanotubes in the acid. The acid can be a mineral acid, an organic acid, or combinations thereof. Examples of acids that could be used to treat and slurry the nanotubes include, but are not limited to, hydrochloric acid, hydrofluoric acid, hydrobromic acid, hydroiodic acid, sulfuric acid, oleum, nitric acid, citric acid, oxalic acid, chlorosulfonic acid, phosphoric acid, trifluoromethane sulfonic acid, glacial acetic acid, monobasic organic acids, dibasic organic acids, and combinations thereof. The acid used can be a pure acid or diluted with a liquid medium, such as an aqueous and/or organic solvent. Generally, an aqueous solvent is preferred. Pure acid or acid diluted in a liquid medium will be referred to as the acid medium. Concentrated aqueous hydrochloric acid is preferred for removing metallic impurities and forming a SWNT-acid slurry.

The ratio of the amount of nanotubes to the amount of acid medium can be dependent on the strength of the acid and/or other factors related to the end-use application. For example, using concentrated HCl as the acid medium, the concentration of nanotubes could range between about 1 g/l and about 100 g/l of concentrated hydrochloric acid.

Formation of a SWNT-acid slurry is facilitated by agitating the acid with the nanotubes for some length of time. Agitation can be done by any stirring or agitation means, such as by mechanical stirrer, rotary stirrer, sonication, forcing the mixture through sieves with pressure, and combinations thereof. Heat may also be applied to the acid-nanotube mixture to facilitate slurry formation. Heating the nanotube mixture between room temperature and the boiling point of the acid medium can promote slurry formation.

The agitation time for making the SWNT-acid slurry can vary depending on various factors, including, but not limited to, the acid, the SWNT-acid ratio, the temperature during agitation, and the original purity of the nanotubes. Generally, an agitation time from about 1 hour to about 24. hours is typical.

After the SWNT-acid mixture is agitated and a SWNT-acid slurry is formed, the excess acid is removed from the SWNT-acid slurry. Filtering can be by any known means, however, gentle filter means is preferred. In one embodiment, gravitational filtration through a large porcelain Büchner funnel under atmospheric pressure is done to filter the excess acid.

After filtering off the excess acid, the SWNT-acid slurry is washed with water to remove acid and form a SWNT-water slurry. The SWNT-acid slurry can be washed continuously by any known means. In one embodiment, washing the SWNT-acid slurry can be done by continuously adding water, preferably deionized water, to the SWNT-acid slurry at a rate approximately equal to the rate the filtrate elutes from the filter. Other washing media could be used to wash the acid from the acid-SWNT slurry. Examples of other washing media include, but are not limited to, alcohols, aldehydes, ketones, dilute alkaline solutions, ammonium hydroxide, primary, secondary and teriary amines, oxygenated hydrocarbons, hydroxylated hydrocarbons, organic aromatics and combinations thereof.

The washing is preferably done slowly. In one embodiment, water is continuously added to the SWNT-acid slurry using a peristaltic pump set at a flow rate such that the amount of water added to the SWNT-acid slurry is approximately equal to the filtrate flowing from the filter funnel. The washing is continued until the filtrate from the filter is clear and colorless and the pH is neutral, i.e., pH is about 7. The pH can be monitored periodically with pH paper or monitored by other means, such as with a pH meter or titration methods.

The amount of time and washing media, such as water, needed to wash the SWNT-acid slurry are dependent on various factors, including, but not limited to the concentration and type of acid, the amount of SWNT-acid slurry, the flow rate of the washing media, the funnel configuration, and the amount of nanotubes. The washing can typically take from about an hour to several days. The amount of the water needed can range from about one times the volume of nanotubes to about 100 times the volume of the nanotubes.

After the filtrate is clear and colorless and the pH is about neutral, washing is stopped. If water was the washing media, the nanotubes are in the form of a SWNT-water slurry. For the sake of clarity, water will be used in the following description, but, it will be understood that other washing media, such as hydrocarbons, oxygenated hydrocarbons, alcohols, etc., could be used, as noted previously. The excess water is then removed by filtration from the SWNT-water slurry. The excess water can be removed by known means, but is preferably removed slowly. Gentle means of water removal is also preferred. Slow, gentle means of water removal is preferred so as to preserve the random points of contact between the nanotubes and/or nanotube ropes. An example of slow, gentle means of water removal is by gravity filtration. Centrifugation can be used to separate and remove excess water; however, centrifugation should not be done so as to compress the SWNT-water slurry. A vacuum may be applied during filtration, but it should be used sparingly and gently, so as not to compress the SWNT-water slurry. Application of a strong vacuum may compress the SWNT-water slurry and cause the three-dimensional structure formed in the slurry to be compacted, such that SWNT buckyrock material does not form. Slow evaporation is preferred in order to dry the nanotubes in place and preserve the randomly-entangled three-dimensional network of nanotubes. Draining the excess water is conveniently done overnight by gravity filtration, however, shorter or longer times can be used, depending on, among other things, the amount of water to be drained, the amount of nanotubes and the filter configuration.

After the excess water is drained, the resulting form of the SWNT is a gel-like, thick SWNT-water paste. The paste can be transferred to a container and allowed to dry very slowly. To retard or slow down the drying, a lid with a few small holes can be placed on the container. In an embodiment of the present invention, the drying can be done at room temperature over a period of months, e.g., 1 to 4 months. The amount of drying time can depend on, among other things, the ambient temperature, the humidity of the ambient air and vent hole area in the lid. In another embodiment, the drying time can be altered with the use of different slurrying media. Shorter or longer drying times can be effected using solvents or liquids with higher or lower vapor pressures, respectively. In such a case, a solvent exchange can be done to produce a SWNT slurry in the desired solvent or liquid media.

In the embodiment where water is the slurrying media, as moisture evaporates from the SWNT-water paste, the SWNT-water paste shrinks isotropically into a block material, known as SWNT buckyrock, generally in the shape of the container, but smaller, due to shrinkage of the SWNT-water paste. The container for the SWNT-water paste can be shaped in such a way that after drying, SWNT buckyrock material is of, or nearly, the desired shape for the particular end-use application. As an example, a cylindrical buckyrock can be formed in a cylindrical container. The container can be made of any known material, such as, but not limited to, glass, metal, plastic, or ceramic. Regardless of the configuration or shape, the size of the 3-dimensional buckyrock will generally be at least about 1 mm in each orthogonal dimension.

SWNT buckyrock is mechanically strong, tough, impact resistant and resistant to cutting and indentation with a knife. SWNT buckyrock can be polished with a fine grain emery paper to produce a smooth surface.

In another embodiment, derivatized single-wall carbon nanotubes can also be used to make solid buckyrock material. Side-wall and end derivatization of single-wall carbon nanotubes with suitable functional groups can influence the bonding characteristics of the entangled SWNT network and provide a means for covalent or ionic bonding and cross-linking, in addition to any forces holding the nanotubes together non-covalently, such as, for example, van der Waals forces and, in certain instances, hydrogen bonding.

In the embodiment where side or end-derivatized nanotubes are used to make SWNT buckyrock, the nanotubes can be purified by any known means. After purification and washing, the nanotubes can be derivatized on their ends, sides or both. Methods to derivatize single-wall carbon nanotubes are given in International Patent Publications, "Carbon Fibers formed from Single-wall Carbon Nanotubes, WO 98/39250 filed Mar. 6, 1998, and "Chemical Derivatization of Single-Wall Carbon Nanotubes," WO 00/17101 filed Sep. 17, 1999, and are included herein in their entirety. Regardless if the single-wall carbon nanotubes are derivatized on their ends, their sides, or both, the SWNT will be referred to as derivatized SWNT for convenience and clarity.

The carbon nanotubes can be derivatized on their ends or sides with functional groups, such as alkyl, acyl, aryl, aralkyl, halogen; substituted or unsubstituted thiol; unsubstituted or substituted amino; hydroxy, and OR' wherein R' is selected from the group consisting of alkyl, acyl, aryl aralkyl, unsubstituted or substituted amino; substituted or unsubstituted thiol, and halogen; and a linear or cyclic carbon chain optionally interrupted with one or more heteroatom, and optionally substituted with one or more =O, or =S, hydroxy, an aminoalkyl group, an amino acid, or a peptide. Generally, the number of carbon atoms in the alkyl, acyl, aryl, aralkyl groups can be in the range of one to about 30.

The following definitions are used herein.

The term "alkyl" as employed herein includes both straight and branched chain radicals; for example methyl, ethyl, propyl, isopropyl, butyl, t-butyl, isobutyl, pentyl, hexyl, isohexyl, heptyl, 4,4-dimethylpentyl, octyl, 2,2,4-trimethylpentyl, nonyl, decyl, undecyl, dodecyl, the various branched chain isomers thereof. The chain may be linear or cyclic, saturated or unsaturated, containing, for example, double and triple bonds. The alkyl chain may be interrupted or substituted with, for example, one or more halogen, oxygen, hydroxy, silyl, amino, or other acceptable substituents.

The term "acyl" as used herein refers to carbonyl groups of the formula —COR wherein R may be any suitable substituent such as, for example, alkyl, aryl, aralkyl, halogen; substituted or unsubstituted thiol; unsubstituted or substituted amino, unsubstituted or substituted oxygen, hydroxy, or hydrogen.

The term "aryl" as employed herein refers to monocyclic, bicyclic or tricyclic aromatic groups containing from 6 to 14 carbons in the ring portion, such as phenyl, naphthyl substituted phenyl, or substituted naphthyl, wherein the substituent on either the phenyl or naphthyl may be for example $C_{1-4}$ alkyl, halogen, $C_{1-4}$ alkoxy, hydroxy or nitro.

The term "aralkyl" as used herein refers to alkyl groups as discussed above having an aryl substituent, such as benzyl, p-nitrobenzyl, phenylethyl, diphenylmethyl and triphenylmethyl.

The term "aromatic or non-aromatic ring" as used herein are preferably 5–8 membered aromatic and non-aromatic rings uninterrupted or interrupted with one or more heteroatom, for example O, S, SO, $SO_2$, and N, or the ring may be unsubstituted or substituted with, for example, halogen, alkyl, acyl, hydroxy, aryl, and amino, said heteroatom and substituent may also be substituted with, for example, alkyl, acyl, aryl, or aralkyl.

The term "linear or cyclic" when used herein includes, for example, a linear chain which may optionally be interrupted by an aromatic or non-aromatic ring. Cyclic chain includes, for example, an aromatic or non-aromatic ring which may be connected to, for example, a carbon chain which either precedes or follows the ring.

The term "substituted amino" as used herein refers to an amino which may be substituted with one or more substituent, for example, alkyl, acyl, aryl, aralkyl, hydroxy, and hydrogen.

The term "substituted thiol" as used herein refers to a thiol which may be substituted with one or more substituent, for example, alkyl, acyl, aryl, aralkyl, hydroxy, and hydrogen.

After end-derivatization, side-derivatization, or a combination thereof, the nanotubes are gently washed with a solvent to remove any reactants and impurities. A slurry of the nanotubes with a solvent, such as water, can then be formed. The nanotubes and the solvent are agitated or stirred to facilitate preparation of the SWNT-solvent slurry. After formation of the SWNT-solvent slurry, the excess solvent can be slowly drained so as to minimize compaction of the nanotubes. Gravity filtration can be used to slowly drain excess solvent. Note, application of a gentle vacuum may be used, however, strong vacuum-assisted filtration may collapse the nanotube entanglements formed in slurrying and result in a SWNT powder upon drying, rather than a solid block of SWNT buckyrock. As the solvent slowly drains, a SWNT-solvent paste is formed. After formation of the SWNT-solvent paste, the remainder of the solvent is slowly evaporated. Although not meant to be held by theory, the slow evaporation appears to retain the isotropic nanotube entanglements and nanotube-to-nanotube contact points made in the SWNT paste, while minimizing nanotube compaction. After slowly evaporating the solvent from the SWNT-solvent paste, e.g. at room temperature in a closed container having a few holes in the top or side through which the vaporized solvent can diffuse from the container, the SWNT-solvent paste shrinks into a SWNT buckyrock of the approximate shape as the original container for the SWNT-solvent paste. The resulting buckyrock is a 3-dimensional block comprising at least about 75 wt % derivatized SWNT, preferably at least about 80 wt % derivatized SWNT, more preferably greater than about 90 wt % derivatized SWNT, and even more preferably greater than 95 wt % derivatized SWNT. The solid block buckyrock material comprising isotropically-entangled derivatized single-wall carbon nanotubes has properties of mechanical toughness, strength and impact resistance.

The SWNT buckyrock material, either comprising single-wall carbon nanotubes or derivatized single-wall carbon nanotubes, has mechanical properties that make the material useful in structural, shock-absorbing, elastic, armor and ballistic-protection applications. This material can also be used in platform substrates for microelectromechanical (MEMS) systems and can be sandwiched as a thin slice in between, or part of, a multilayer heterostucture with polymers, glass, metals, alloys, silicon, other non-metals, or combinations thereof. Hereinafter, for convenience and clarity, SWNT buckyrock will be used with the understanding that the term also includes both buckyrock from underivatized SWNT as well as derivatized SWNT.

Besides high mechanical strength, the SWNT buckyrock form makes single-wall carbon nanotubes easier to handle. Typically, single-wall carbon nanotubes in neat form appear as a fluffy powder. SWNT in a block material can facilitate SWNT transport and handling.

The SWNT buckyrock material can be used in applications that require high thermal and/or electrical conductivity. Also, depending on the level and type of derivatization, the SWNT buckyrock material can be used in applications requiring electrical insulators—all the while providing superior mechanical properties.

After the SWNT buckyrock material is prepared, the single-wall carbon nanotubes appear very tightly and densely enmeshed at the microscopic level and as a dense solid at the macroscopic level. However, the single-wall carbon nanotubes can be redispersed. Strong acids, such as 100% sulfuric acid can be used to redissolve and redisperse the nanotubes. Other acids that can be used to redisperse the single-wall carbon nanotubes of the buckyrock, include, but are not limited to, oleum, hydrofluoric acid, chlorosulfonic acid, trifluoromethane sulfonic acid and combinations thereof. After redispersion with acid, the nanotubes can be washed with water and used in the intended application.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

This example demonstrates a method to prepare a solid SWNT block or buckyrock. 35 grams of raw HIPCO® single-wall carbon nanotubes (HIPCO is a registered trademark of Carbon Nanotechnologies, Inc., Houston, Tex.) were purified to remove amorphous carbon and metallic catalyst residues. The nanotubes were placed in a 4-liter glass beaker. To remove amorphous carbon, the nanotubes were heated at 250° C. for 15 hours in air saturated with water vapor. After the heating, the metallic iron-containing catalyst residues were removed with concentrated hydrochloric acid. One liter of concentrated hydrochloric acid was added to the nanotubes in the beaker and stirred overnight (about 15 hours) at room temperature. The resulting mixture was a SWNT-acid slurry.

To remove most of the acid from the SWNT-acid slurry, the slurry was filtered using a large (8-inch diameter, 2.5-inch deep) porcelain Büchner funnel under atmospheric pressure.

While still in the funnel, the residual acid was washed from the nanotube slurry with deionized water. A peristaltic pump was used to add water to the nanotube slurry continuously, such that the rate of water addition (drop-wise) matched the rate of drainage at the funnel outlet. Excess water was maintained on the top of the nanotubes during the entire washing procedure to maintain uniform washing of the nanotube slurry. The water washing was continued until the filtrate from the Büchner funnel was clear and colorless and the pH was neutral, as indicated by pH paper. Washing this quantity of nanotubes took over a day and used about 15 liters of wash water. When the filtrate was clear and the pH neutral, the water pump was stopped. Excess water was drained from the resulting SWNT-water slurry, which took about 10 more hours.

After the excess water drained, the mass of nanotubes, which appeared as a gel-like, paste-like material, was transferred to a 2-liter beaker and took up about 1 liter in volume. The beaker was covered with an aluminum foil and a few holes were punched in the foil. The nanotube gel-like material was allowed to dry very slowly in a hood with normal air flow at room temperature. Over a period of about 8 weeks, the sample gradually dried isotropically to a cylindrical dense mass and is referred to as a carbon nanotube block (CNB), or buckyrock. There was no carbonaceous matter sticking to any of the glass surface where the SWNT-water paste had made contact.

After drying, the cylindrical SWNT block solid weighed 28 grams, and had approximate dimensions of 1.5 inches in diameter and 1.2 inches in height. The bottom portion of the cylinder that was in contact with the beaker surface was slightly wider indicating some resistance to shrinking. The cylindrical mass also had several visible pores. The cylindrical mass was cut into pieces with a steel hacksaw blade and polished to a mirror-like finish with emery papers of decreasing grit size. A photograph of a sliced, polished block of buckyrock, given in FIG. 1, shows light reflection from the polished surface. The piece of buckyrock in FIG. 1 weighed 0.2042 g and had dimensions of 1.34 cm by 0.9 cm by 0.235 cm.

EXAMPLE 2

Figure 2:
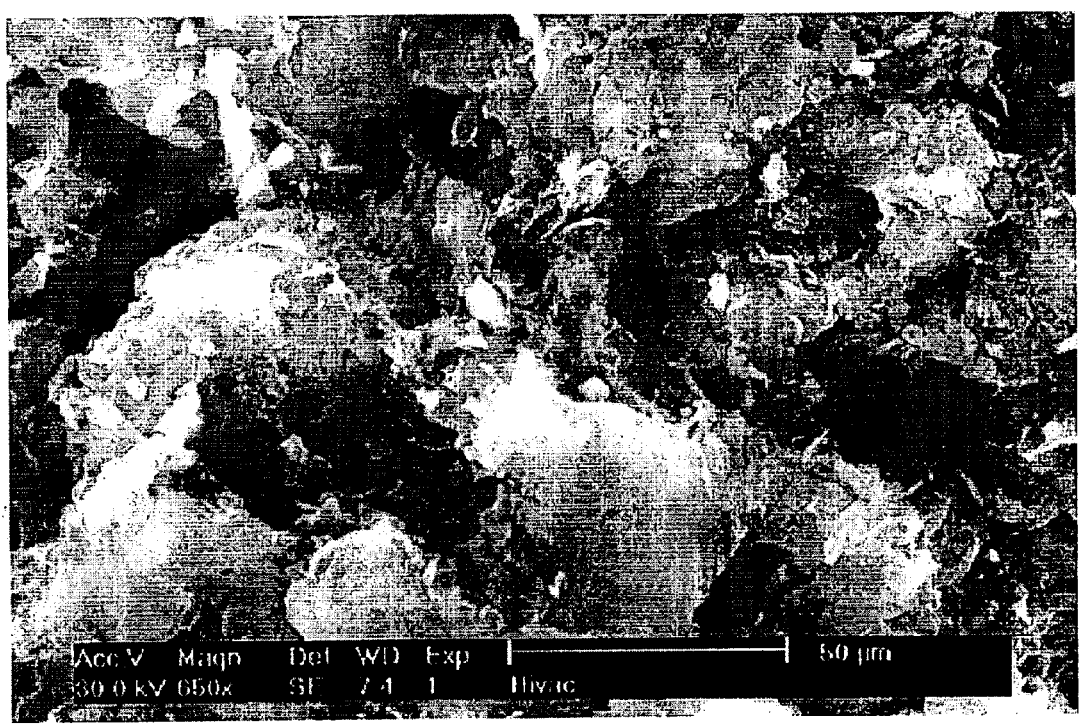
FIG. 2 is a scanning electron micrograph (SEM) of the surface of an as-produced buckyrock comprising single-wall carbon nanotubes.
Figure 3:
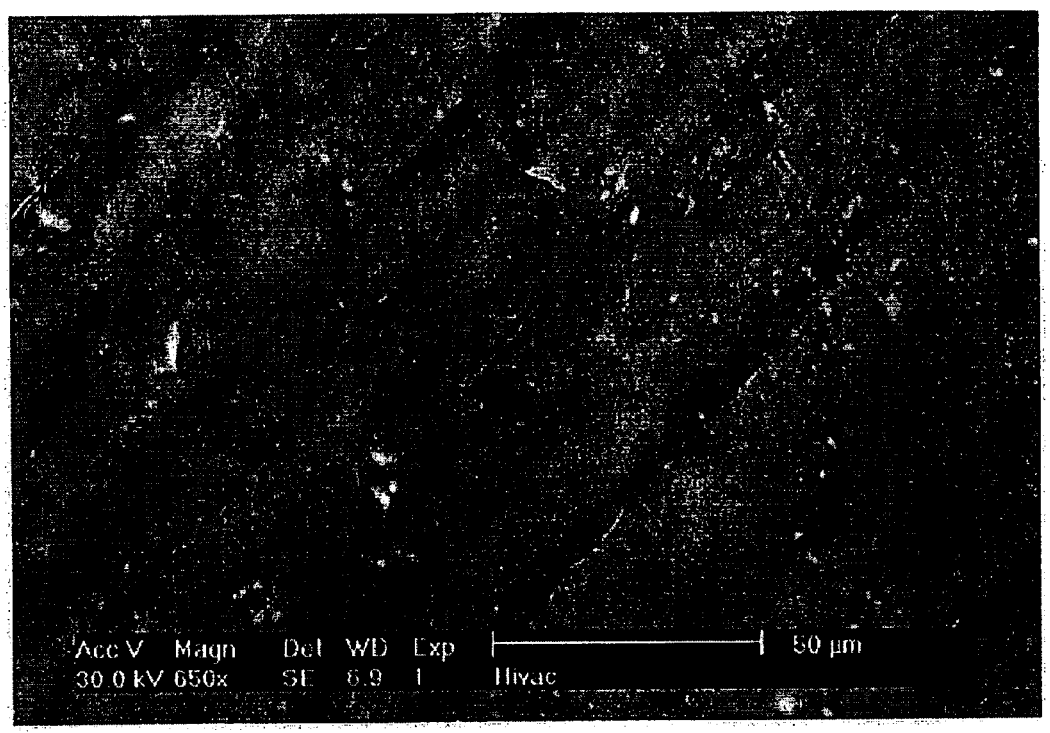
FIG. 3 is a SEM of the surface of a buckyrock after coarse mechanical polishing.
Figure 4:
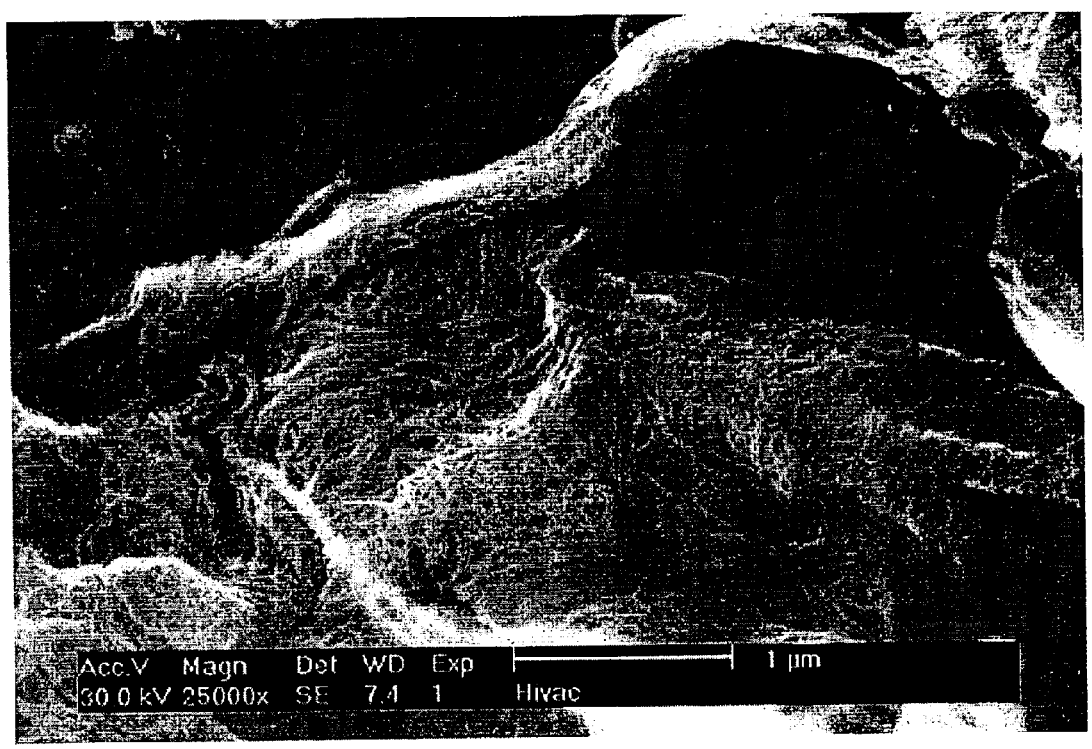
FIG. 4 is a SEM of the surface of a single buckyrock showing a highly-entangled network of single-wall carbon nanotube "ropes."

This example demonstrates the morphology of as-produced and polished SWNT buckyrock solid surfaces using scanning electron microscopy (SEM). FIG. 2 shows a SEM at 650× magnification of a piece of as-produced buckyrock. Surface porosity is highly apparent in as-produced buckyrock. FIG. 3 shows a SEM at 650× magnification, of a piece of buckyrock that has been coarsely polished with emery paper. The block appears densely packed and uniform. The parallel lines in FIG. 3 are small gouges from the large grit emery paper. At 25,000× magnification, as shown in FIG. 4, the surface of the as-produced SWNT buckyrock block the surface appears as a densely-packed, entangled network of SWNT ropes.

Figure 5:
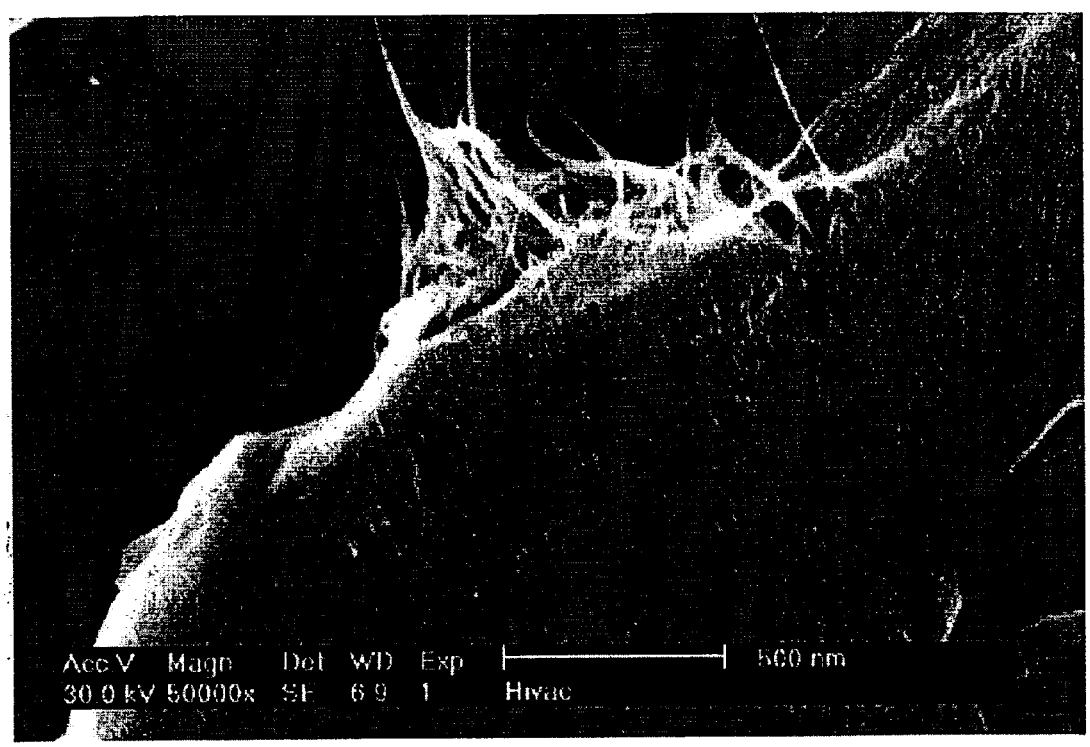
FIG. 5 is a SEM of a buckyrock surface after mechanical polishing showing macroscopic formability and highly entangled single-wall carbon nanotube ropes at an edge.

The SWNT buckyrock block was polished on a side with a fine-grain emery paper. As shown in FIG. 5, at 50,000× magnification, the polished surface of the SWNT block shows a high degree of smoothness. SWNT ropes at one edge appear highly entangled.

EXAMPLE 3

This example demonstrates selected physical properties of SWNT buckyrock material.

The mechanical impact resistance of SWNT buckyrock block material was tested by hitting the SWNT buckyrock block prepared in Example 1 with a hammer. The block could not be broken with the hammer using considerable force.

To demonstrate toughness, attempts were made to cut the buckyrock with a sharp knife edge. The buckyrock gave extreme resistance to the back and forth movement of the blade and left only a minor indentation.

Microindentation hardness measurements were done using the Vickers test (ASTM Standard E 384). Although the buckyrock material is very solid, rigid, and generally inflexible, indention marks were observed with a 5 g weight. No quantification of hardness could be assessed because the measurement was not in the range of the test. Buckyrock looks more like a block of stiff material than a flexible material like rubber. However, for purposes of this test, the microindentation hardness test indicated a soft material.

A small piece of SWNT buckyrock material was cut from the block prepared in Example 1 using a hacksaw. The bulk density was calculated to be 0.7205 g/cm$^3$, indicative of a light-weight material in bulk form. The small piece was placed in water. Initially, and for a few minutes, it floated, but subsequently sank, indicative of a density greater than 1 g/cm$^3$.

EXAMPLE 4

This example demonstrates the potential for redispersing single-wall carbon nanotubes from a buckyrock block. Small portions of the solid SWNT buckyrock prepared in Example 1 were cut using a hacksaw. Two small portions with a total volume of approximately 1 cm$^3$ were placed in a small conical flask. 25 ml of 100% sulfuric acid was added to the buckyrock pieces and the flask was closed with a ground glass stopper. Initially, the small buckyrock pieces floated in 100% sulfuric acid. Over about two days, the SWNT buckyrock pieces gradually swelled in volume and occupied the whole of the liquid volume (about 25 cc). The swollen SWNT-100% $H_2SO_4$ paste was very rigid and did not show fluidity.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A method for making a macroscopic, three-dimensional single-wall carbon nanotube solid block material, comprising:
    a) forming a paste comprising single-wall carbon nanotubes and a liquid; and
    b) removing the liquid from the paste to form a macroscopic three-dimensional solid block of entangled single-wall carbon nanotubes, wherein each dimension is at least about 1 mm and wherein the block material comprises at least about 75 wt % single-wall carbon nanotubes.

2. The method of claim 1, wherein the solid block material comprises at least about 85 wt % single-wall carbon nanotubes.

3. The method of claim 1, wherein the solid block material comprises at least about 90 wt % single-wall carbon nanotubes.

4. The method of claim 1, wherein the solid block material comprises at least about 95 wt % single-wall carbon nanotubes.

5. The method of claim 1, wherein the solid block material consists essentially of single-wall carbon nanotubes.

6. The method of claim 1, wherein the single-wall carbon nanotubes are in a form selected from the group consisting of ropes of single-wall carbon nanotubes, individual single-wall carbon nanotubes and a combination thereof.

7. The method of claim 1, further comprising purifying the single-wall carbon nanotubes.

8. The method of claim 1, wherein the liquid is selected from the group consisting of water, hydrocarbon, oxygenated hydrocarbon, aromatic compounds, and combinations thereof.

9. The method of claim 1, wherein the paste is formed from a slurry of the single-wall carbon nanotubes and the liquid.

10. The method of claim 1, wherein the liquid is water.

11. The method of claim 1, wherein the single-wall carbon nanotubes are derivatized by a method selected from the group consisting of side-wall derivatization, end-derivatization, and a combination thereof.

12. A macroscopic, three-dimensional solid block material comprising single-wall carbon nanotubes, wherein the solid block material comprises at least about 75 wt % entangled single-wall carbon nanotubes and wherein each dimension is at least about 1 mm.

13. The material of claim 12, wherein the solid block material comprises at least about 85 wt % single wall carbon nanotubes.

14. The material of claim 12, wherein the solid block material comprises at least about 90 wt % single-wall carbon nanotubes.

15. The material of claim 12, wherein the solid block material comprises at least about 95 wt % single-wall carbon nanotubes.

16. The material of claim 12, wherein the single-wall carbon nanotubes are in a form selected from the group consisting of ropes of single-wall carbon nanotubes, individual single-wall carbon nanotubes and a combination thereof.

17. An armor comprising the material of claim 12, wherein the armor is capable of absorbing kinetic energy of a projectile.

18. The armor of claim 17, wherein armor is vehicle armor.

19. The armor of claim 17, wherein the armor is body armor.

20. A microelectromechanical system comprising a platform structure, wherein the platform structure comprises the material of claim 12.

21. A structure comprising:
    (a) a macroscopic, three-dimensional solid block material, wherein the solid block material comprises at least about 75 wt % entangled single-wall carbon nanotubes and wherein each dimension is at least about 1 mm;
    (b) a first heterostructure layer;
    (c) a second heterostructure layer, wherein the solid block material is dispersed between the first heterostructure layer and the second heterostructure layer.

22. The structure of claim 21, wherein the first heterostructure layer comprises a first substance selected from the group consisting of polymers, glass, metals, alloys, silicon, non-metals, and combinations thereof.

23. The structure of claim 22, wherein the first heterostructure layer and the second heterostructure layer are the same substance.

24. The structure of claim 22, wherein the second heterostructure layer comprises a second substance, selected from the group consisting of polymers, glass, metals, alloys, silicon, non-metals, and combinations thereof, and the first heterostructure layer and the second hetero structure layer are different substances.

* * * * *

UNITED STATES PATENT AND TRADEMARK OFFICE
CERTIFICATE OF CORRECTION

PATENT NO. : 6,899,945 B2 Page 1 of 1
DATED : May 31, 2005
INVENTOR(S) : Richard E. Smalley and Ramesh Sivarajan It is certified that error appears in the above-identified patent and that said Letters Patent is hereby corrected as shown below:

Column 11,
Line 21, insert -- - -- after "single" and before "wall".

Column 12,
Line 30, replace "hetro structure" with -- hetrostructure --.

Signed and Sealed this

Twenty-third Day of May, 2006

JON W. DUDAS
*Director of the United States Patent and Trademark Office*